United States Patent
Zhang

(12) 
(10) Patent No.: US 10,302,919 B2
(45) Date of Patent: May 28, 2019

(54) MIRRORLESS LARGE-APERTURE ULTRA WIDE-ANGLE LENS

(71) Applicant: Anhui Changgeng Optics Technology Co., LTD, Anhui (CN)

(72) Inventor: Xiaohua Zhang, Kunshan (CN)

(73) Assignee: ANHUI CHANGGENG OPTICS TECHNOLOGY CO., LTD., Hefei, Anhui (CN)

( * ) Notice: Subject to any disclaimer, the term of this patent is extended or adjusted under 35 U.S.C. 154(b) by 223 days.

(21) Appl. No.: 15/588,218

(22) Filed: May 5, 2017

(65) Prior Publication Data
US 2018/0149842 A1  May 31, 2018

(30) Foreign Application Priority Data
Nov. 25, 2016  (CN) .......................... 2016 1 1050404

(51) Int. Cl.
*G02B 13/04* (2006.01)
*G02B 13/06* (2006.01)
*G02B 13/00* (2006.01)

(52) U.S. Cl.
CPC ........... *G02B 13/06* (2013.01); *G02B 13/001* (2013.01)

(58) Field of Classification Search
CPC .............................. G02B 13/06; G02B 13/001
See application file for complete search history.

(56) References Cited

FOREIGN PATENT DOCUMENTS

| JP | 2011-102871 A | | 5/2011 | |
|----|---------------|---|--------|---|
| JP | 2013-020073 | * | 1/2013 | ............. G02B 13/04 |
| JP | 2013-020073 A | | 1/2013 | |

* cited by examiner

*Primary Examiner* — Joseph P Martinez
(74) *Attorney, Agent, or Firm* — Muncy, Geisler, Olds & Lowe, P.C.

(57) ABSTRACT

A mirrorless large-aperture ultra wide-angle lens relates to a wide-angle lens of which a full angle of view is over 100 degrees, and sequentially comprises two parts from an object side to an image side: a first lens group Gr1 having a positive diopter and a second lens group Gr2 having a positive diopter; when an object moves closer from infinity, the first lens group Gr1 is fixed, the second lens group Gr2 moves towards the object to implement an ultra wide-angle microlens which is in focus and meets the following conditional expression: $2.0 \leq F1/F2 \leq 10$, wherein F1: a focal length of the first lens group Gr1; and F2: a focal length of the first lens group Gr2. The Invention can provide a miniaturized, high-performance, low-cost ultra wide-angle lens whose angle of view is over 100 degrees, achieving strong universality.

7 Claims, 4 Drawing Sheets

Example 1

MIRRORLESS LARGE-APERTURE ULTRA WIDE-ANGLE LENS

FIELD OF THE INVENTION

The Invention relates to a wide-angle lens whose full angle of view is over 100 degrees, which can be widely applied to digital camera lenses, video camera lenses, and drone cameras, and especially to the field of mirrorless camera lenses.

BACKGROUND OF THE INVENTION

Currently, most of the commonly known wide-angle lenses with an angle of view over 100 degrees have a structure starting with a negative diopter. For example, the commonly known Japanese Patent Publication No. 2011-102871, starting from an object side, consists of a first lens group having a negative diopter, a second lens group having a positive diopter, and a third lens group having a positive diopter. When an object moves closer from infinity, the second lens group moves towards an image, and the third lens group moves towards the object to realize focusing. However, there are a lot of lenses in the first lens group and the second lens group, and especially, a second focusing quantity is too large, resulting in an excessively heavy weight of lenses and high focusing load, and a focusing speed cannot be ensured. Moreover, because there are too many lenses, the lens is large in size and high in costs, and cannot be regarded as a miniaturized high-performance wide-angle lens.

Further, the commonly known Japanese Patent Publication No. 2013-20073, starting from an object side, consists of a first lens group having a negative diopter, a second lens group having a negative diopter, and a third lens group having a positive diopter. When an object moves closer from infinity, the second lens group move towards an object space to realize focusing. As a spatial requirement for focusing needs to be guaranteed, enough space is needed for the first lens group and the second lens group; the angle of view of an ultra wide-angle lens is very large, which leads to an extremely large aperture of the first lens group, so that a miniaturized ultra wide-angle lens cannot be achieved.

SUMMARY OF THE INVENTION

To overcome the above problem that the commonly known wide-angle lens cannot be miniaturized, the Invention provides a miniaturized, high-performance, low-cost wide-angle lens.

The Utility Model employs the following technical solution to solve the technical problem thereof:

A mirrorless large-aperture ultra wide-angle lens sequentially includes two parts from an object side to an image side: a first lens group Gr1 having a positive diopter and a second lens group Gr2 having a positive diopter. When an object moves closer from infinity, the first lens group Gr1 is fixed, the second lens group Gr2 moves towards the object to implement an ultra wide-angle microlens which is in focus and meets the following conditional expression:

$$2.0 \leq F1/F2 \leq 10 \quad (1)$$

where,
F1: a focal length of the first lens group Gr1; and
F2: a focal length of the first lens group Gr2.

The first lens group consists of a front half group G1F consisting of continuous concave lenses and a rear half part G1B having a positive diopter.

Conditional expressions (2) and (3) are met:

$$0.6 \leq |F11/F| \leq 1.2 \quad (2)$$

$$1.2 \leq F12/F \leq 2.2 \quad (3)$$

where,
F: a focal length of a whole optical system in an infinity state;
F11: a focal length of the front half group G1F of the first lens group Gr1; and
F12: a focal length of the rear half part G1B of the first lens group Gr1.

Conditional expression (4) is met:

$$0.4 \leq BF/F2 \leq 1.0 \quad (4)$$

where,
BF: a distance from a surface, which is closest to the image side, to an image in an infinity state; and
F2: a focal length of the second lens group Gr2.

An angle of view of the lens is over 100 degrees.

If a lower limit of the conditional expression (1) is exceeded, the focal length of the first lens group is too long, which facilitates miniaturization but makes it relatively difficult to achieve an ultra large angle of view, and meanwhile, it is also very difficult to ensure a back focal length (the back focal length means a distance from the last lens to the image). If an upper limit of the conditional expression (1) is exceeded, although an ultra large angle of view can be effectively achieved, miniaturization of an effective aperture of the first group will be very difficult to control, and it is very hard to implement an overall miniaturized and low-cost design solution.

If a lower limit of the conditional expression (2) is exceeded, the front half part G11 of the first lens group has an excessively strong diopter; although the effective aperture can be effectively controlled and an ultra wide angle can be achieved, excessive reinforcement may lead to difficulty in correction of various aberrations such as chromatic aberration and coma. If an upper limit of the conditional expression (2) is exceeded, various aberrations can be desirably corrected; however, while the ultra wide angle of view is achieved, the volume of the front group of the optical system is very difficult to control, and a miniaturized design cannot be realized.

If a lower limit of the conditional expression (3) is exceeded, the rear half part G12 of the first lens group has an excessively strong diopter, and in order to achieve balance of the first lens group Gr1, the diopter of the front half part G11 of the first group is also increased inevitably; although this is beneficial to miniaturization, various aberrations may occur, making correction extremely difficult, and it is hard to guarantee a good imaging effect. If an upper limit of the conditional expression (3) is exceeded, the aberration correction is facilitated, but the miniaturization design becomes extremely difficult, resulting in a large size and increasing the costs.

If a lower limit of the conditional expression (4) is exceeded, the diopter of the second lens group Gr2 will become too weak, resulting in an excessively short back focal length, which easily interferes with a shutter component of a camera body. If an upper limit of the conditional expression (4) is exceeded, it is very easy to avoid the problem of interference between the rear lens group and the shutter component; however, it is adverse to the miniaturization design, and results in an increase in the size and costs of the lens.

The Invention has the following beneficial effects: the Invention can provide a miniaturized, high-performance, and low-cost ultra wide-angle lens whose angle of view is over 100 degrees, achieving strong universality.

DETAILED DESCRIPTION OF THE INVENTION

To make the technical measures, creation features, and achieved objectives and effects of the Invention easy to understand, the following further illustrates the Invention with reference to specific drawings.

Example 1

Figure 1:
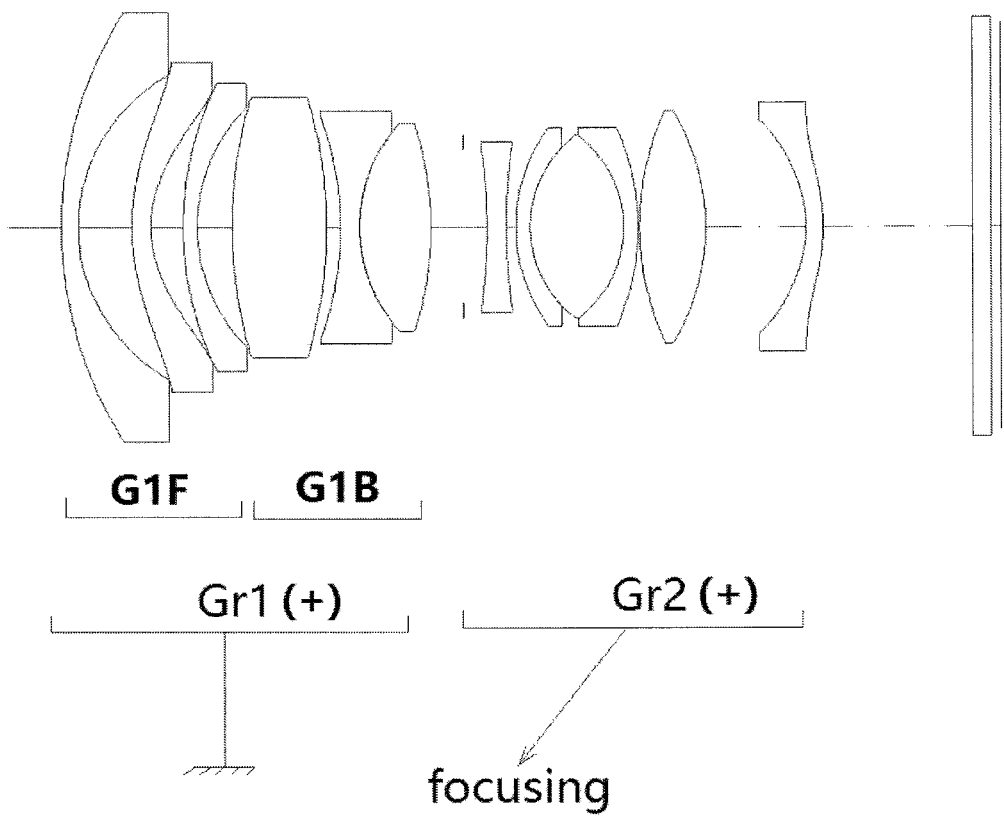
FIG. 1 is a schematic structural view of Example 1 of the Invention.

As shown in FIG. 1, a mirrorless large-aperture ultra wide-angle lens sequentially includes two parts from an object side to an image side: a first lens group Gr1 having a positive diopter and a second lens group Gr2 having a positive diopter. When an object moves closer from infinity, the first lens group Gr1 is fixed, the second lens group Gr2 moves towards the object to achieve focusing. The first lens group consists of a front half group G1F consisting of continuous concave lenses and a rear half part G1B having a positive diopter.

Figure 2:
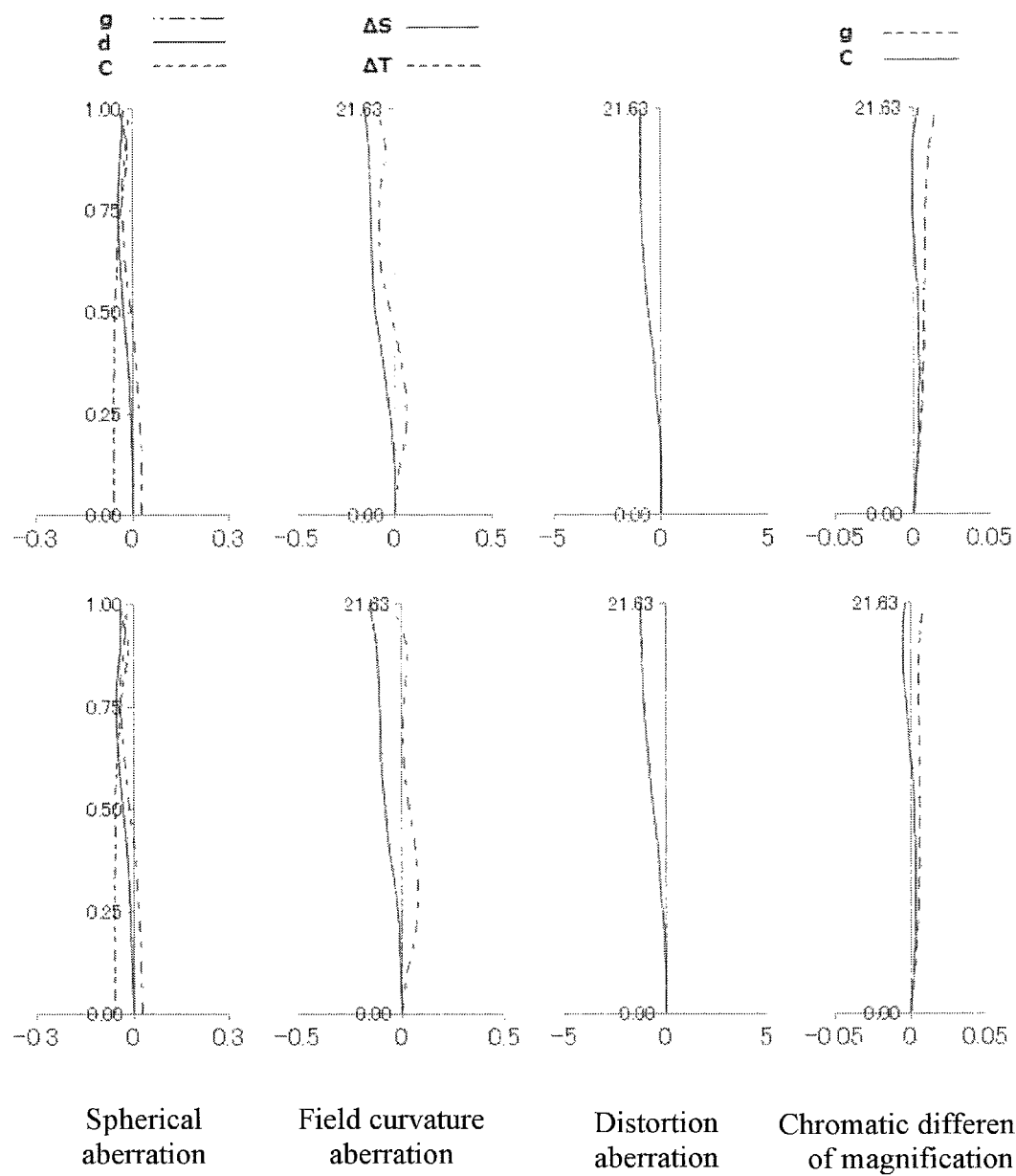
FIG. 2 is a schematic view of a spherical aberration, a field curvature aberration, a distortion aberration, and a chromatic difference of magnification according to Example 1 of the Invention.

A spherical aberration, a field curvature aberration, a distortion aberration, and a chromatic difference of magnification at the maximum image magnification in an infinity state of Example 1 are as shown in FIG. 2.

Data of Example 1 is as follows:

R(mm): a radius of curvature of each surface
D(mm): an interval between lenses and lens thickness
Nd: a refractive index of each glass of line d
Vd: the Abbe number of glass
Focal length: 15.5
Fno: 2.06
Half angle of view ω: 54.7-54.7

| Surface | Radius of curvature R | Interval thickness D | Refractive index Nd | Abbe number Vd |
|---|---|---|---|---|
| 1 | 43.7777 | 1.8000 | 1.72916 | 54.67 |
| 2 | 18.7557 | 5.6312 | | |
| 3* | 25.0000 | 2.0000 | 1.80610 | 40.73 |
| 4* | 12.8006 | 3.4629 | | |
| 5 | 35.2429 | 1.5000 | 1.80518 | 25.46 |
| 6 | 18.4938 | 3.6876 | | |
| 7 | 49.4811 | 10.0000 | 1.91082 | 35.25 |
| 8 | −49.4811 | 1.5000 | | |
| 9 | −34.1159 | 2.0000 | 1.49700 | 81.61 |
| 10 | 16.8442 | 0.0000 | | |
| 11 | 16.8442 | 7.5000 | 1.62004 | 36.30 |
| 12 | −36.4636 | D(12) | | |
| 13 STOP | inf | 2.4344 | | |
| 14 | −64.3212 | 2.0000 | 1.80610 | 33.27 |
| 15 | 64.3212 | 1.0000 | | |
| 16 | 18.1302 | 1.5000 | 1.90366 | 31.31 |
| 17 | 12.4289 | 9.9000 | 1.49700 | 81.61 |
| 18 | −12.4289 | 1.5000 | 1.83481 | 42.72 |
| 19 | −26.3138 | 0.1500 | | |
| 20 | 30.3336 | 7.0000 | 1.49700 | 81.61 |
| 21 | −24.3462 | 10.5287 | | |
| 22* | −14.0614 | 1.8000 | 1.58313 | 59.46 |
| 23* | −20.0000 | D(23) | | |
| 24 | inf | 2.0000 | 1.51680 | 64.20 |
| 25 | inf | D(25) | | |

Aspheric surface

| | K | 4(B) | 6(C) | 8(D) | 10(E) | 12(F) |
|---|---|---|---|---|---|---|
| 3 | −1.3707 | −1.17922e−005 | −2.42926e−008 | 1.19122e−010 | −4.63418e−013 | 4.68088e−016 |
| 4 | 0.2535 | −2.62577e−005 | −1.64819e−007 | 4.27783e−010 | −2.38377e−012 | 4.58404e−015 |
| 22 | 1.1397 | 2.80111e−005 | 1.12817e−007 | −9.53129e−009 | 2.83332e−011 | 0.00000e+000 |
| 23 | −6.2261 | −3.98955e−005 | 1.56517e−006 | −1.18499e−008 | 4.20888e−011 | −6.35520e−014 |

-continued

| | Focal length | 15.5000 | 0.020 times |
|---|---|---|---|
| | D(12) | 3.4480 | 3.1500 |
| | D(23) | 15.6837 | 15.9816 |
| | D(25) | 1.0000 | 1.0000 |

Definitions of shapes of the aspheric surface:
y: a radial coordinate starting from an optical axis.
z: an offset amount, starting from an intersection between the aspheric surface and the optical axis, in an optical axis direction.
r: a radius of curvature of a reference sphere of the aspheric surface.
K: aspheric coefficients of the 4th, 6th, 8th, 10th and 12th powers.

$$z = \frac{(1/r)y^2}{1 + \sqrt{1 - (1+K)(y/r)^2}} + A4y^4 + A6y^6 + A8y^8 + A10y^{10} + A12y^{12}$$

Example 2

Figure 3:
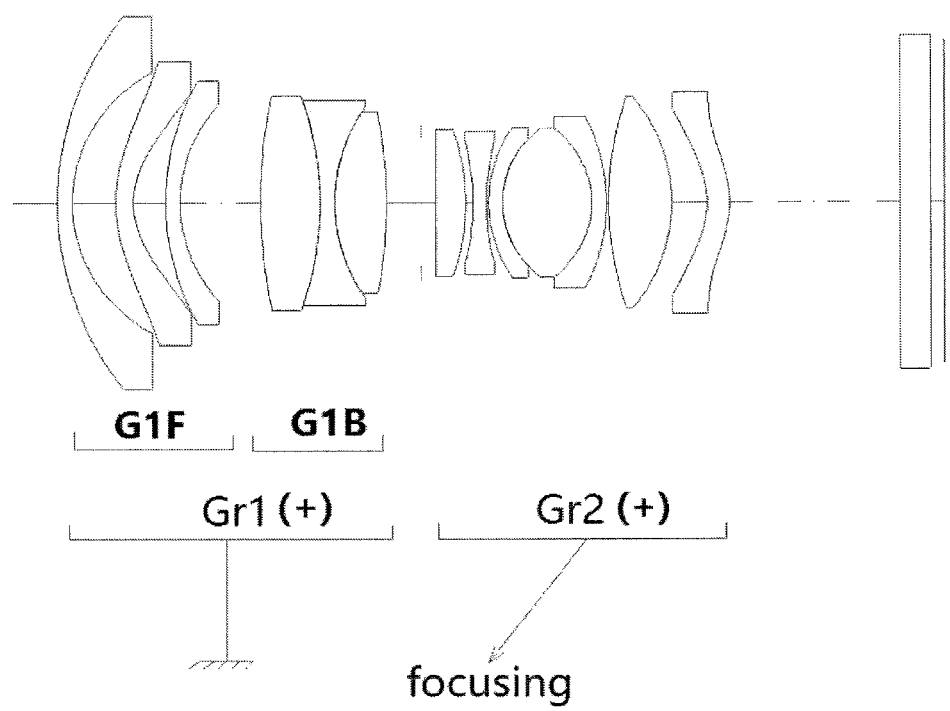
FIG. 3 is a schematic structural view of Example 2 of the Invention.

As shown in FIG. 3, a mirrorless large-aperture ultra wide-angle lens sequentially includes two parts from an object side to an image side: a first lens group Gr1 having a positive diopter and a second lens group Gr2 having a positive diopter. When an object moves closer from infinity, the first lens group Gr1 is fixed, the second lens group Gr2 moves towards the object to achieve focusing. The first lens group consists of a front half group G1F consisting of continuous concave lenses and a rear half part G1B having a positive diopter.

Figure 4:
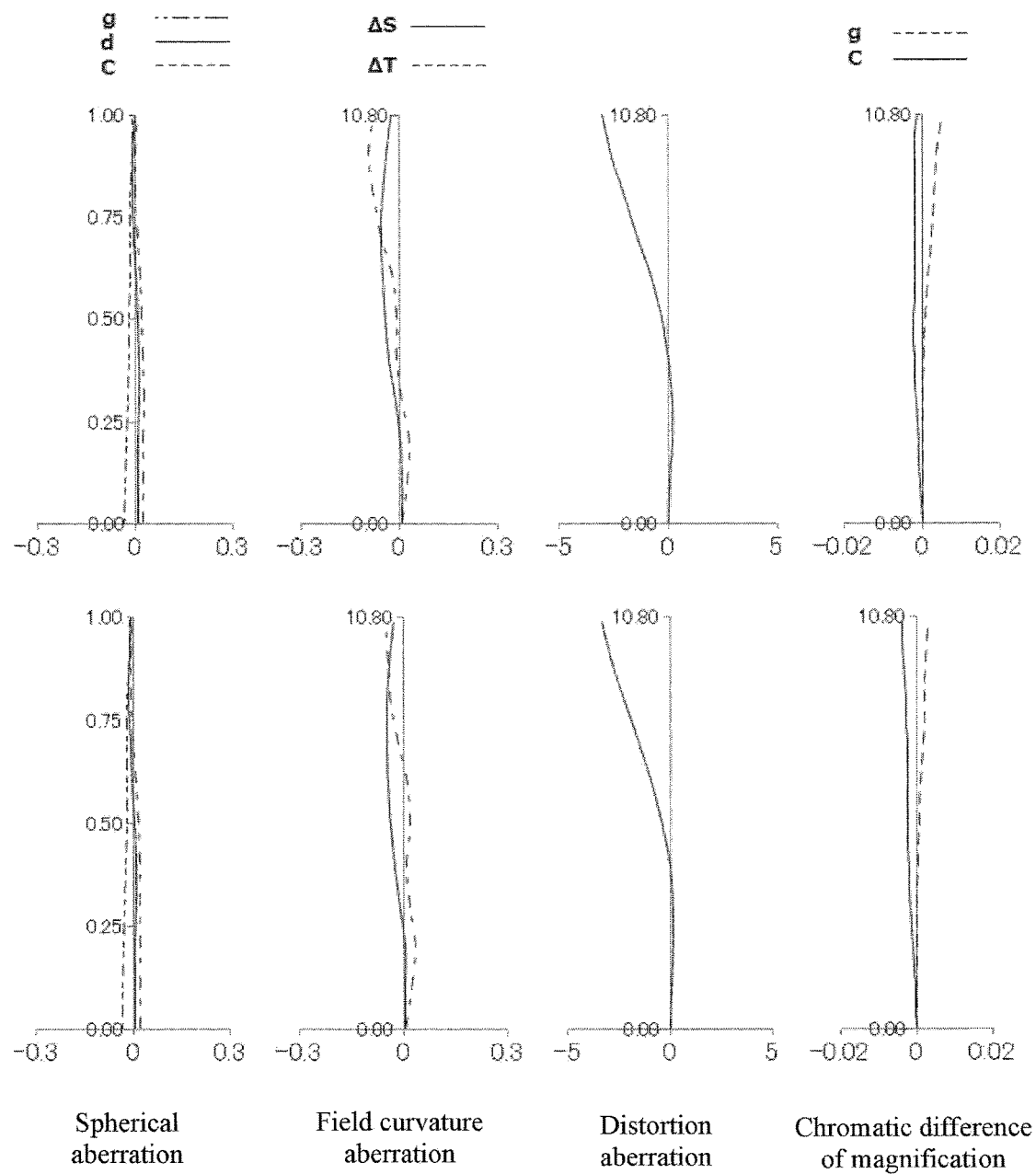
FIG. 4 is a schematic view of a spherical aberration, a field curvature aberration, a distortion aberration, and a chromatic difference of magnification according to Example 2 of the Invention.

A spherical aberration, a field curvature aberration, a distortion aberration, and a chromatic difference of magnification at the maximum image magnification in an infinity state of Example 2 are as shown in FIG. 4.

Data of Example 2 is as follows:

R(mm): a radius of curvature of each surface
D(mm): an interval between lenses and lens thickness
Nd: a refractive index of each glass of line d
Vd: the Abbe number of glass
Focal length: 7.804
Fno: 2.06
Half angle of view ω: 55.0

| Surface | Radius of curvature R | Interval thickness D | Refractive index Nd | Abbe number Vd |
|---|---|---|---|---|
| 1 | 20.7512 | 1.0000 | 1.72916 | 54.67 |
| 2 | 10.1708 | 2.9515 | | |
| 3★ | 10.1026 | 1.2000 | 1.80610 | 40.73 |
| 4★ | 5.7487 | 2.1752 | | |
| 5 | 17.0000 | 1.0000 | 1.84666 | 23.78 |
| 6 | 10.0437 | 5.4933 | | |
| 7 | 37.5129 | 4.0000 | 1.91082 | 35.25 |
| 8 | −22.4563 | 1.0000 | 1.49700 | 81.61 |
| 9 | 11.6151 | 3.5000 | 1.62004 | 36.30 |
| 10 | −34.0002 | D(10) | | |
| 11 STOP | 0.0000 | 1.0000 | | |
| 12 | 0.0000 | 2.0000 | 1.58144 | 40.89 |
| 13 | −15.7664 | 0.5000 | | |
| 14 | −17.4668 | 0.9000 | 1.80610 | 33.27 |
| 15 | 17.4668 | 0.1500 | | |
| 16 | 9.2486 | 0.9500 | 1.90366 | 31.31 |
| 17 | 6.5000 | 6.0000 | 1.49700 | 81.61 |
| 18 | −6.5000 | 1.0000 | 1.83481 | 42.72 |
| 19 | −12.8414 | 0.1500 | | |
| 20 | 22.6687 | 4.3000 | 1.49700 | 81.61 |
| 21 | −11.3732 | 2.3839 | | |
| 22★ | −6.2568 | 1.5000 | 1.58313 | 59.46 |
| 23★ | −7.6026 | D(23) | | |
| 24 | inf | 2.0000 | 1.51680 | 64.20 |
| 25 | inf | D(25) | | |

| Aspheric surface | | | | | | |
|---|---|---|---|---|---|---|
| | K | 4(B) | 6(C) | 8(D) | 10(E) | 12(F) |
| 3 | 0.8348 | −3.65975e−004 | −6.80430e−008 | 1.73728e−008 | −2.49120e−010 | 5.47675e−013 |
| 4 | 0.3787 | −4.95499e−004 | −5.51814e−006 | 9.22181e−008 | −1.30623e−009 | 2.57756e−012 |
| 22 | 0.6191 | 8.76468e−004 | 1.66733e−005 | −4.72333e−008 | 4.40672e−009 | 0.00000e+000 |
| 23 | −3.2074 | −2.30126e−004 | 3.26260e−005 | −6.93548e−007 | 6.56674e−009 | −2.56663e−011 |

-continued

| | | |
|---|---|---|
| Focal length | 7.8040 | 0.0153 times |
| D(10) | 2.3490 | 2.2338 |
| D(23) | 11.5108 | 11.6350 |
| D(25) | 1.0000 | 1.0000 |

(Summary table of conditional expressions)

| Conditional expression | Example 1 | Example 2 |
|---|---|---|
| Conditional expression (1): $2.0 \leq F1/F2 \leq 10$ | 6.469 | 3.183 |
| Conditional expression (2): $0.6 \leq |F11/F| \leq 1.2$ | 0.788 | 0.911 |
| Conditional expression (3): $1.2 \leq F12/F \leq 2.2$ | 1.599 | 1.934 |
| Conditional expression (4): $0.4 \leq BF/F2 \leq 1.0$ | 0.553 | 0.777 |

Basic principles and main features of the Invention as well as advantages of the Invention are shown and described above. Those skilled in the art should understand that the Invention is not limited to the foregoing examples. The above examples and the description in the specification are merely used for illustrating the principle of the Invention, and the Invention may further have various changes and improvements without departing from the spirit and scope of the Invention. All these changes and improvements fall in the protection scope of the Invention. The protection scope of the Invention is defined by the appended claims and equivalencies thereof.

The invention claimed is:

1. A mirrorless large-aperture ultra wide-angle lens, sequentially comprising two parts from an object side to an image side: a first lens group Gr1 having a positive diopter and a second lens group Gr2 having a positive diopter, wherein when an object moves closer from infinity, the first lens group Gr1 is fixed, the second lens group Gr2 moves towards the object to implement an ultra wide-angle microlens which is in focus and meets the following conditional expression:

$$2.0 \leq F1/F2 \leq 10 \quad (1)$$

wherein,
F1: a focal length of the first lens group Gr1; and
F2: a focal length of the first lens group Gr2.

2. The mirrorless large-aperture ultra wide-angle lens according to claim 1, wherein the first lens group consists of a front half group G1F consisting of continuous concave lenses and a rear half part G1B having a positive diopter.

3. The mirrorless large-aperture ultra wide-angle lens according to claim 2, wherein conditional expressions (2) and (3) are met:

$$0.6 \leq |F11/F| \leq 1.2 \quad (2)$$

$$1.2 \leq F12/F \leq 2.2 \quad (3)$$

wherein,
F: a focal length of a whole optical system in an infinity state;
F11: a focal length of the front half group G1F of the first lens group Gr1; and
F12: a focal length of the rear half part G1B of the first lens group Gr1.

4. The mirrorless large-aperture ultra wide-angle lens according to claim 1, wherein a conditional expression (4) is met;

$$0.4 \leq BF/F2 \leq 1.0 \quad (4)$$

wherein,
BF: a distance from a surface, which is closest to the image side, to an image in an infinity state; and
F2: a focal length of the second lens group Gr2.

5. The mirrorless large-aperture ultra wide-angle lens according to claim 1, wherein an angle of view of the lens is over 100 degrees.

6. The mirrorless large-aperture ultra wide-angle lens according to claim 2, wherein a conditional expression (4) is met;

$$0.4 \leq BF/F2 \leq 1.0 \quad (4)$$

wherein,
BF: a distance from a surface, which is closest to the image side, to an image in an infinity state; and
F2: a focal length of the second lens group Gr2.

7. The mirrorless large-aperture ultra wide-angle lens according to claim 3, wherein a conditional expression (4) is met;

$$0.4 \leq BF/F2 \leq 1.0 \quad (4)$$

wherein
BF: a distance from a surface, which is closest to the image side, to an image in an infinity state; and
F2: a focal length of the second lens group Gr2.

* * * * *